… …

UNITED STATES PATENT OFFICE 2,365,852

PROCESS AND REAGENT FOR DEMULSIFYING OILS

Meyer S. Agruss, Chicago, and Hans Schindler, Evanston, Ill., assignors to The Pure Oil Company, Chicago, Ill., a corporation of Ohio No Drawing. Application September 17, 1941, Serial No. 411,152

8 Claims. (Cl. 252—336)

This invention relates to a process and reagent for demulsifying oils.

Petroleum oils as they are produced from oil wells frequently are emulsified with water which sometimes contains considerable quantities of salts, which water or brine is in the dispersed phase. It is necessary to separate the major portion of the aqueous phase from the oil prior to pumping the oil through pipelines and prior to refining the oil in order to prevent excessive corrosion of equipment.

The object of this invention is to provide a method and reagent for breaking water-in-oil emulsions so that the major portion of the water or brine contained in the emulsion may be separated from the oil.

We have discovered that sulfonated tall oil is an excellent demulsifying agent for water-in-oil emulsions. Tall oil is a dark odorous material recovered from waste cooking liquor in the manufacture of kraft paper pulp. It is common practice to purify the tall oil by distillation or by solvent and/or sulfuric acid refining and to sulfonate the refined product. The sulfonation may be effected at a temperature of 32°–68° F. with from 50–100% by weight of concentrated sulfuric acid. The acid is added slowly to the oil while the latter is stirred. Excess acid is washed out with sodium chloride solution and the resulting product neutralized with sodium hydroxide solution. A purified form of tall oil is now available commercially under the name "Indusoil," and "sulfonated tall oil" is also available on the market under the brand names "Sulfonated Indusoil C–50" and "Sulfonated Indusoil 63."

Although we have found that sulfonated tall oil alone is an efficient demulsifying agent, its efficiency can be increased in some cases by mixing therewith a small proportion of a material which is adsorbed on the material acting as stabilizer for the oil-water emulsion and acts to lower the interfacial tension between the oil and water. As materials which will serve this function we have found a compound selected from the group (1) of poly hydroxy aliphatic hydrocarbons and their halogen substituted products such as glycerin dichlorhydrin mixed with a compound selected from the group (2) of aromatic amines such as n-butyl aniline, n-propyl aniline and ethyl aniline, and pyridine, quinoline and their substitution products, to be highly satisfactory. Other compounds from group (1) which may be substituted for the glycerin dichlorhydrin are dichloropentane, ethylene glycol and diethylene glycol. It will be understood that any mixture of group (1) compounds can be used in conjunction with any mixture of group (2) compounds.

In order to demonstrate the efficacy of demulsifying agents in accordance with our invention, a series of tests were run on crude oil containing water in the dispersed phase, using the following demulsifying agents:

| Composition | Identified as— |
|---|---|
| Sulfonated Indusoil C–50 | A |
| Sulfonated Indusoil 63, 90% by volume. Glycering dichlorhydrin, 6% by volume. n-Butyl aniline, 4% by volume | B |
| Sulfonated Indusoil 63, 90% by volume. Glycerin dichlorhydrin, 6% by volume. Quinoline, 4% by volume | C |

Demulsifying agents A, B and C were compared with a well-known branded demulsifying agent which will hereinafter be referred to as D, and the following results were obtained:

Table I

| Source of crude oil | Formation from which crude oil was obtained | Demulsifying agent used | Per cent B. S. & W. remaining in oil after treat | Settling time in hours | Temp. of treat. |
|---|---|---|---|---|---|
| Illinois | Sand | A | .2 | 22 | Degrees 95 |
| Do | do | B | .2 | 22 | 95 |
| Do | do | C | .3 | 22 | 95 |
| Do | do | D | .2 | 22 | 95 |

In each of the tests listed in Table I the ratio of demulsifying agent to oil was 3 gallons to 120 barrels. It will be seen from Table I that Sulfonated Indusoil C–50 alone was equivalent to the commercial demulsifying agent. Since pipeline specifications require that the crude oil shall not contain more than .25% of B. S. & W., it will be seen that oils demulsified with demulsifiers A and B met the B. S. & W. pipeline requirements and that oils demulsified with demulsifier C almost met pipeline requirements.

Another series of tests were run on the same type of crude. The results of these tests were as follows:

Table II

| Source of crude oil | Formation from which crude oil was obtained | Demulsifying agent used | Temp. of treat. | Time of settlement | Efficiency |
|---|---|---|---|---|---|
| Illinois | Lime | A | Degrees 125 | Hours 5–6 | 206 |
| Do | do | B | 125 | 5–6 | 232 |
| Do | do | C | 125 | 5–6 | 231 |
| Do | do | D | 125 | 5–6 | 100 |

In Table II the efficiency is the measure of the percentage of water separated from the emulsion, assuming the amount of water separated out by commercial demulsifying agent D is 100. In the treatments listed in Table II 0.04% by volume of demulsifying agent was used based on the oil being treated.

It will be seen from Table II that the efficiency of straight "Sulfonated Indusoil" on these tests was more than twice as great as the commercial demulsifying agent and that the "Sulfonated Indusoil" mixed with glycerin dichlorhydrin and n-butyl aniline and with glycerin dichlorhydrin and quinoline were superior to the "Sulfonated Indusoil" alone.

The results set forth in Tables I and II are results obtained in the laboratory on crude oil shipped in drums from the producing fields. Some water had separated from these oils mechanically during shipment and this water was decanted off before the tests were made.

In a field test in which the oil and water as it came directly from the well was treated with demulsifying agents, the following results were obtained:

Table III

| Source of crude oil | Formation from which crude oil was obtained | Demulsifying agent | Ratio demulsifying agent to clean oil obtained | Per cent B. S. & W. in treated oil | Temp. of treat. |
|---|---|---|---|---|---|
| Illinois | Lime | A | 2 gal.-705 bbls. | 0.2 | Degrees 120 |
| Do | do | D | 1 gal.-550 bbls. | 0.2 | 120 |

Although the quantity of "Sulfonated Indusoil" required to obtain the required B. S. & W. was larger than is required for the commercial demulsifying agent, the cost of the "Sulfonated Indusoil" is much less than one-half the cost of the commercial demulsifying agent and, therefore, "Sulfonated Indusoil" will give the desired results at a much lower cost than will the commercial demulsifying agent.

From an inspection of Table I "Sulfonated Indusoil" alone appears to be superior to "Sulfonated Indusoil" when mixed with the other reagents, whereas the added chemicals enhance the demulsifying properties of the "Sulfonated Indusoil" in the tests tabulated in Table II. These results conform with experience in demulsifying of oils. The oils tested in each case were from different wells and the difficulty in breaking emulsions varies from well to well. However, in each case "Sulfonated Indusoil" was able to lower the B. S. & W. to a point necessitated by commercial requirements.

The proportions of sulfonated tall oil and chemicals necessary to treat the emulsion may vary within wide limits, but it is preferred to prepare the demulsifying agent with the major portion thereof constituted by sulfonated tall oil and minor proportions of the glycerin dichlorhydrin and n-butyl aniline or their equivalents. The ratio of demulsifying agent to oil treated may also vary within wide limits. We have found that generally from 0.1° gallon of demulsifying agent to 100 barrels of emulsified oil to 1 gallon of demulsifying agent to 100 barrels of oil is sufficient to obtain the required B. S. & W. value. Treatment of the emulsion with the demulsifying agent may take place at atmospheric temperature, but in order to expedite the separation of the water and oil phases it is preferable to heat the emulsion to a temperature between 80° and 150° F. after adding the demulsifying agent.

Ordinarily, the water and oil phases are separated by settling and decantation. The time of settling will vary with the temperature of the oil and the quantity of demulsifying agent used. Larger amounts of demulsifying agent and higher temperatures shorten the time of settling required.

We claim:

1. Reagent for use in breaking water-in-oil emulsions comprising a major portion of sulfonated tall oil which has been neutralized with alkali metal hydroxide and a minor proportion of glycerin dichlorhydrin and n-butyl aniline.

2. Reagent for use in breaking water-in-oil emulsions comprising approximately 90% by weight of sulfonated tall oil which has been neutralized with alkali metal hydroxide, approximately 6% by weight of glycerin dichlorhydrin and approximately 4% by weight of n-butyl aniline.

3. Reagent for use in breaking water-in-oil emulsions comprising approximately 90% by weight of sulfonated tall oil which has been neutralized with alkali metal hydroxide, approximately 6% by weight of glycerin dichlorhydrin and approximately 4% by weight of quinoline.

4. The method of breaking water-in-oil emulsions which comprises mixing said emulsions with the reagent of claim 2 and separating the separated water layer from the oil layer.

5. The method of breaking water-in-oil emulsions which comprises mixing said emulsions with the reagent of claim 3 and separating the separated water layer from the oil layer.

6. The method of breaking water-in-oil emulsions which comprises mixing with said emulsions a reagent containing a major portion of sulfonated and neutralized tall oil and a minor portion of a compound selected from the group (1) consisting of aromatic amines, pyridine, quinoline and their substitution products and of a compound selected from the group (2) consisting of polyhydroxy alkyl compounds and their halogen-substituted products, and separating from the mixture an oil and an aqueous layer.

7. Method in accordance with claim 6 in which the compound selected from group (1) is n-butyl aniline and the compound selected from group (2) is glycerin dichlorhydrin.

8. Method in accordance with claim 6 in which the compound selected from group (1) is quinoline and the compound selected from group (2) is glycerin dichlorhydrin.

MEYER S. AGRUSS.
HANS SCHINDLER.